United States Patent
Erie

(10) Patent No.: US 10,528,093 B1
(45) Date of Patent: Jan. 7, 2020

(54) COMPUTING DEVICE EXPANSION CARD WITH ADJUSTABLE HANDLE

(71) Applicant: International Business Machines Corporation, Armonk, NY (US)

(72) Inventor: Cody J. Erie, Adams, MN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/104,481

(22) Filed: Aug. 17, 2018

(51) Int. Cl.
*H05K 7/14* (2006.01)
*G06F 1/18* (2006.01)
*H01R 12/73* (2011.01)
*H01R 12/72* (2011.01)

(52) U.S. Cl.
CPC .............. *G06F 1/186* (2013.01); *G06F 1/181* (2013.01); *H01R 12/721* (2013.01); *H01R 12/737* (2013.01)

(58) Field of Classification Search
CPC ....... G06F 1/181; G06F 1/186; H01R 12/721; H01R 12/737; H05K 7/1489; H05K 7/1409; H05K 7/1415; H05K 7/1424; H05K 7/14; H05K 7/1461
See application file for complete search history.

(56) References Cited

U.S. PATENT DOCUMENTS

| | | | |
|---|---|---|---|
| 5,644,470 A * | 7/1997 | Benedict | G06F 1/184 361/679.32 |
| 5,748,453 A | 5/1998 | Carney et al. | |
| 6,128,196 A * | 10/2000 | Hoyle, Jr. | H05K 7/1409 206/454 |
| 6,288,911 B1 | 9/2001 | Aoki et al. | |
| 6,667,890 B1 * | 12/2003 | Barringer | G06F 1/184 361/752 |
| 6,807,052 B2 | 10/2004 | Erickson et al. | |
| 7,002,791 B2 | 2/2006 | Diatzikis et al. | |
| 7,292,457 B2 | 11/2007 | DeNies et al. | |
| 7,397,674 B2 | 7/2008 | Schlack | |
| 7,724,538 B2 | 5/2010 | Tsai et al. | |
| 7,898,800 B2 | 3/2011 | Fan et al. | |
| 8,665,608 B2 | 3/2014 | Hayashi et al. | |
| 9,015,931 B2 | 4/2015 | Boetzer | |
| 9,345,163 B2 | 5/2016 | Venugopal et al. | |

(Continued)

FOREIGN PATENT DOCUMENTS

WO 2007084403 A2 7/2007

OTHER PUBLICATIONS

Installation of a half height PCI card in carrier, Silicon Graphics, 2000. http://manx-docs.org/mirror/techpubs.sgi.com/library/manuals/4000/007-4569-001/pdf/007-4569-001.pdf.

*Primary Examiner* — Hoa C Nguyen
*Assistant Examiner* — Christopher L Augustin
(74) *Attorney, Agent, or Firm* — Patterson + Sheridan, LLP

(57) ABSTRACT

A method and associated expansion card and computing device are disclosed. The method comprises inserting an expansion card into a connector of a printed circuit board (PCB) of the computing device. The expansion card comprises a handle that is adjustable between at least a retracted position and an extended position. The method further comprises installing a cover of the computing device. The handle is dimensioned such that when the handle is in the extended position, the handle is configured to limit motion of the expansion card toward the cover.

20 Claims, 7 Drawing Sheets

(56) References Cited

U.S. PATENT DOCUMENTS

2010/0159723 A1* 6/2010 Tan .................. H01R 13/62988
                                                         439/153
2011/0292620 A1* 12/2011 Hayashi ............... H05K 7/1409
                                                         361/748
2017/0364128 A1* 12/2017 Schroeder ............... G06F 1/187

* cited by examiner

COMPUTING DEVICE EXPANSION CARD WITH ADJUSTABLE HANDLE

BACKGROUND

The present disclosure relates to an expansion card for a computing device, and more specifically, to an expansion card having an integrated handle.

Computing devices may have their functionality increased by installing one or more expansion cards, such as Peripheral Component Interconnect (PCI™) cards (PCI™ is a trademark of the PCI Special Interest Group (PCI-SIG)). The installation of an expansion card may be challenging, as the expansion card may include sensitive components (e.g., electronic components, interconnects, and/or other components) near edges of the expansion card that are typically used for handling. Additionally, it is possible for an installed expansion cards to come free, e.g., in response to shock and/or vibration.

SUMMARY

According to one embodiment, a method for use with a computing device comprises inserting an expansion card into a connector of a printed circuit board (PCB) of the computing device. The expansion card comprises a handle that is adjustable between at least a retracted position and an extended position. The method further comprises installing a cover of the computing device. The handle is dimensioned such that when the handle is in the extended position, the handle is configured to limit motion of the expansion card toward the cover.

According to another embodiment, an expansion card for use with a computing device comprises a printed circuit board (PCB) portion comprising an edge connector, and a handle connected to the PCB portion. The handle is adjustable between at least a retracted position and an extended position. The handle is dimensioned such that when (i) the handle is in the extended position and (ii) the edge connector is inserted into an edge connector socket of the computing device, a surface of the handle is configured to limit motion of the expansion card toward a reference surface of the computing device.

According to another embodiment, a computing device comprises a printed circuit board (PCB) comprising a connector, a reference surface, and an expansion card removably inserted into the connector. The expansion card comprises a PCB portion and a handle connected to the PCB portion. The handle is adjustable between at least a retracted position and an extended position. The handle is dimensioned such that when (i) the handle is in the extended position and (ii) the expansion card is inserted in the connector, a surface of the handle is configured to limit motion of the expansion card toward the reference surface.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments discussed herein include an expansion card comprising a handle that is adjustable between at least a retracted position and an extended position. The handle is dimensioned such that when the handle is in the extended position and the expansion card is installed (e.g., an edge connector of the expansion card is inserted into an edge connector socket of the computing device), a surface of the handle is configured to limit motion of the expansion card toward a reference surface of the computing device.

In this way, the handle when in the extended position may be used for installing and/or extracting the expansion card, which reduces the risk of damage to sensitive components of the expansion card. The handle when in the extended position may further be used to retain the installed expansion card under various conditions, as the surface of the handle may contact the reference surface of the computing device (e.g., a cover of the computing device) to limit the motion of the expansion card. For example, the distance between the surface of the handle and the reference surface may be controlled to be less than an inserted distance of an edge connector of the expansion card in the installed state. Further, the handle may be dimensioned such that the expansion card maintains a "normal" packaging size (i.e., corresponding to an expansion card without a handle) when the handle is in the retracted position.

Figure 1:
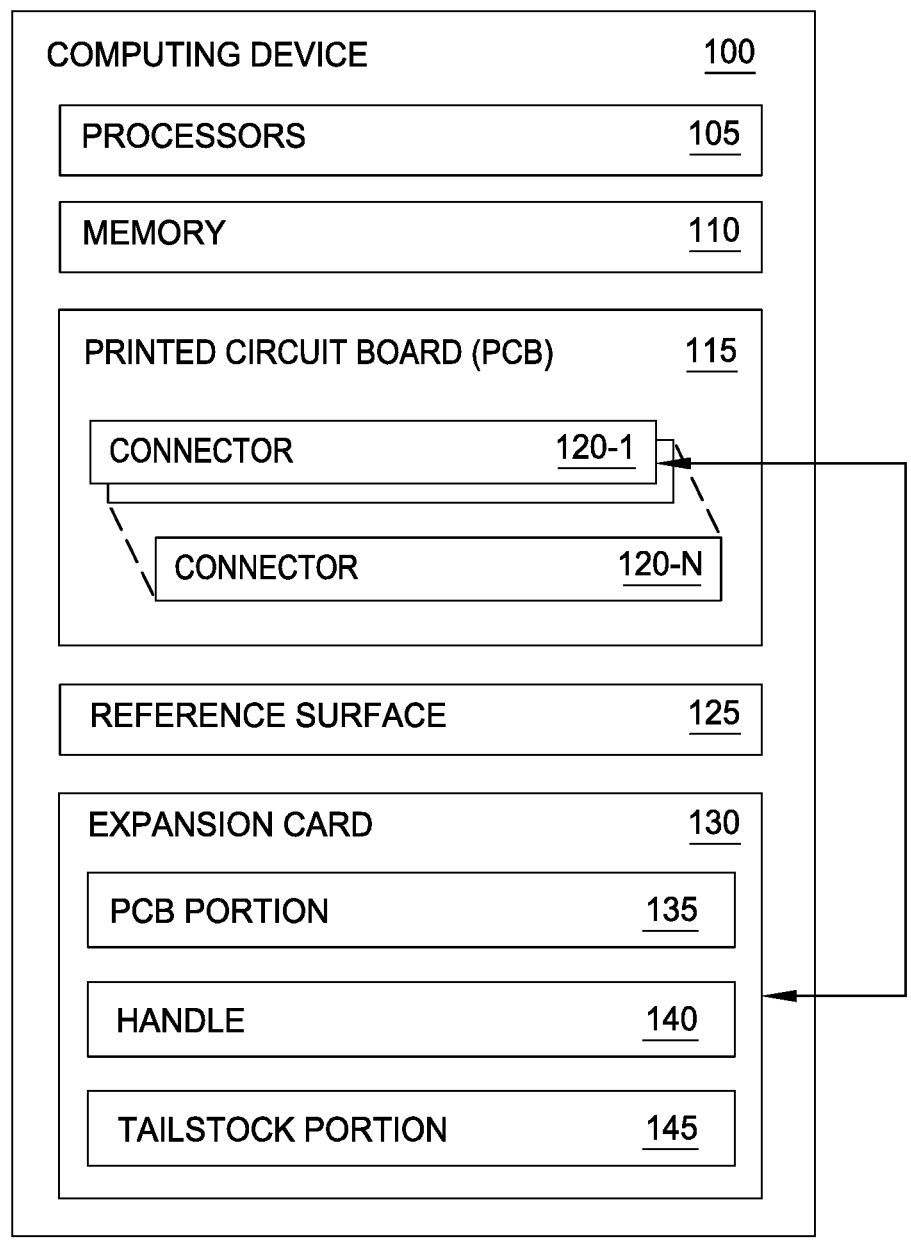
FIG. 1 is a block diagram of a computing device comprising an exemplary expansion card, according to one or more embodiments.

Refer now to FIG. 1, which is a block diagram of a computing device 100 comprising an exemplary expansion card 130, according to one or more embodiments. The computing device 100 may be implemented in any suitable form. Some non-limiting examples of the computing device 100 include a standalone personal computer such as a workstation, a desktop computer, a laptop, a tablet, a smartphone, and so forth. Other non-limiting examples of the computing device 100 include a rack-mountable computing device or embedded computing device, such as a server, an industrial control system, and so forth.

The computing device 100 comprises one or more processors 105 and a memory 110. The one or more processors 105 and the memory 110 may be fixedly or removably attached to a printed circuit board (PCB) 115 of the computing device 100, such as a motherboard or daughterboard. The PCB 115 further comprises one or more connectors 120-1, ..., 120-N (generically, connector 120) into which an expansion card 130 may be installed to expand the functionality of the computing device 100. When installed in the connector 120, the expansion card 130 is communicatively coupled with the one or more processors 105 and/or the memory 110. The expansion card 130 may be configured to provide any suitable functionality to the computing device 100. Some non-limiting examples of the expansion card 130 include a network interface card (NIC), a host bus adapter (HBA), a graphics card, a sound card, and so forth. Another non-limiting example of the expansion card 130 includes a daughterboard configured to be installed The one or more connectors 120-1, ..., 120-N comprise electrical connections with an arrangement according to any suitable interface specifications, whether standardized or proprietary, and whether existing or later-developed. In some embodiments, the one or more connectors 120-1, ..., 120-N may comprise plugs, sockets, pins, or other attachments. Some non-limiting examples of the interface specifications for the one or more connectors 120-1, ..., 120-N include PCI, PCI Extended (PCI-X), and PCI Express (PCIe).

In some embodiments, the expansion card 130 comprises a PCB portion 135 comprising circuitry, discrete electronic components, and/or conductive interconnects. In some embodiments, the expansion card 130 further comprises a tailstock portion 145 that is connected to the PCB portion 135. The tailstock portion 145 may comprise a metal bracket, which may removably connect to a frame or other structure of the computing device 100, e.g., using threaded fasteners such as screws. The metal bracket may define one or more openings providing accessibility to ports connected with components of the PCB portion 135.

The expansion card 130 further comprises a handle 140 that is connected to the PCB portion 135. In some embodiments, the handle 140 is adjustable between at least two positions. In some embodiments, the at least two positions comprises a retracted position and an extended position. The at least two positions may include predefined positions and/or selectable positions. The handle 140 may comprise a locking feature that is configured to lock the handle 140 in the extended position. When the locking feature is depressed or otherwise released, the handle 140 may be adjusted from the extended position to the retracted position.

The handle 140 when in an extended position may be used for installing the expansion card 130 in the computing device 100, and/or extracting the expansion card 130 from the computing device 100. For example, a human operator may grasp the handle 140 directly (e.g., with his or her hand) or indirectly (e.g., using a tool) and manipulate the expansion card 130 into a desired position by applying directional forces to the handle 140.

Further, when the expansion card 130 is inserted into the connector 120, the handle 140 in the extended position is configured to limit motion of the expansion card 130 toward a reference surface 125 of the computing device 100. In this way, the handle 140 in the extended position may retain the expansion card 130 in an inserted state in the connector 120. For example, the distance between a surface of the handle 140 and the reference surface 125 may be controlled to be less than an inserted distance of an edge connector of the expansion card 130 in the installed state. In some cases, the distance may be substantially zero, such that the surface of the handle 140 is in a contacting relationship with the reference surface 125.

The reference surface 125 may have any suitable form. In some embodiments, the reference surface 125 comprises a cover of the computing device 100, such as an inner surface of a panel or a portion of a sheet metal enclosure. In some embodiments, the reference surface 125 comprises a portion of an inner frame of the computing device 100. In some embodiments, the reference surface 125 comprises an installed component of the computing device 100, such as a portion of an installed hard drive or solid-state drive.

In some embodiments, the handle 140 may be dimensioned such that the expansion card 130 maintains a "normal" packaging size (i.e., corresponding to an expansion card without a handle) when the handle 140 is in the retracted position. Beneficially, the expansion card 130 may maintain a small footprint despite the handle 140, and/or may reduce costs by utilizing existing packaging processes and techniques without the need for reconfiguration.

Figure 2:
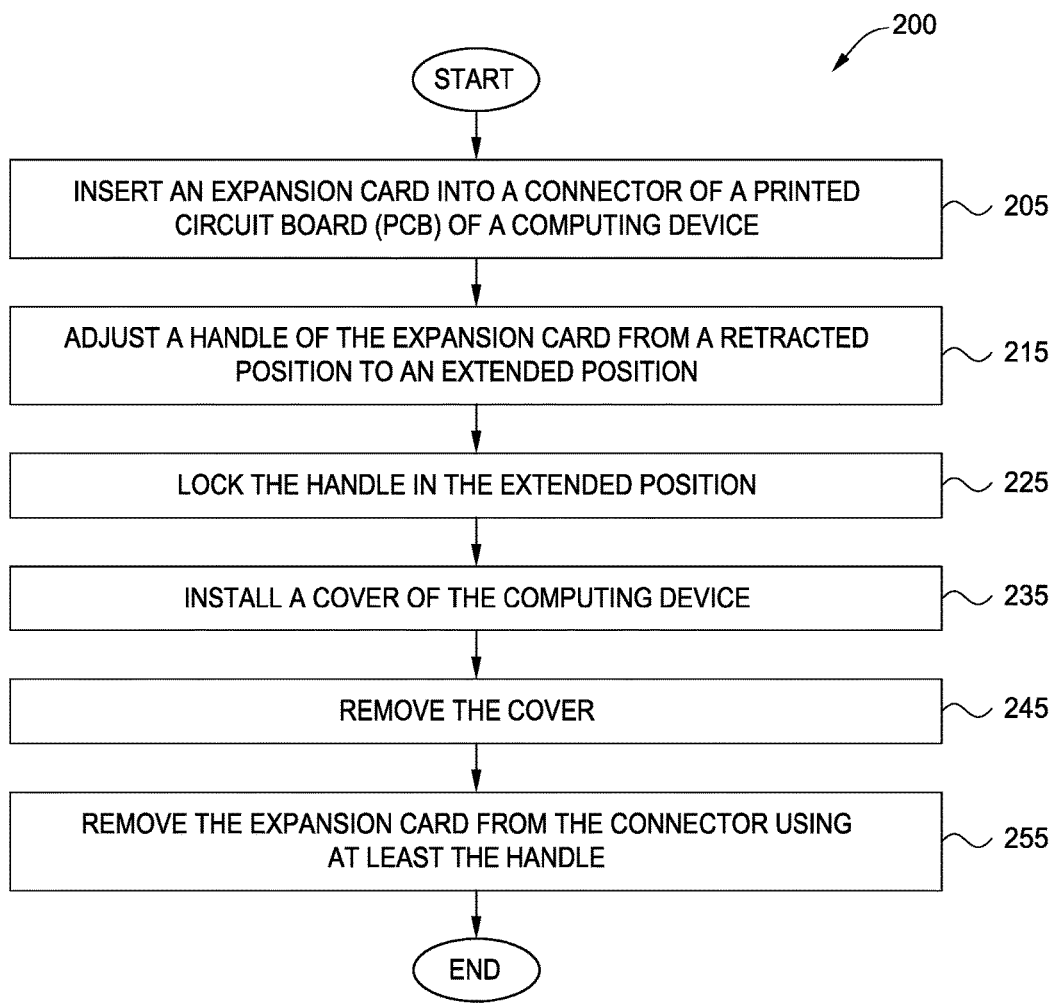
FIG. 2 is an exemplary method for use with a computing device, according to one or more embodiments.

FIG. 2 is an exemplary method 200 for use with a computing device, according to one or more embodiments. The method 200 may be used in conjunction with other embodiments, such as the computing device 100 of FIG. 1. The method 200 begins at block 205, where an expansion card is inserted into a connector of a PCB of a computing device. In some embodiments, the expansion card comprises an edge connector, and the connector of the PCB comprises an edge connector socket.

At block 215, a handle of the expansion card is adjusted from a retracted position to an extended position. The handle in the extended position is configured to limit motion of the expansion card toward a reference surface of the computing device. At block 225, the handle is locked in the extended position. In some embodiments, the handle comprises a locking feature such as a locking tab.

At block 235, a cover of the computing device is installed. The cover may represent the reference surface of the computing device. In some embodiments, the cover comprises a panel or a portion of a sheet metal enclosure. Thus, blocks 205-235 may represent an installation process of the expansion card.

At block 245, the cover is removed. In some embodiments, removing the cover corresponds to removing the reference surface of the computing device. At block 255, the expansion card is removed from the connector using at least the handle. In some embodiments, a tailstock portion of the expansion card is also used to remove the expansion card. In some alternate embodiments, the handle is adjusted from the retracted position into the extended position before removing the expansion card. Thus, blocks 245, 255 may represent an extraction process of the expansion card. The method 200 ends following completion of block 255.

Figure 3:
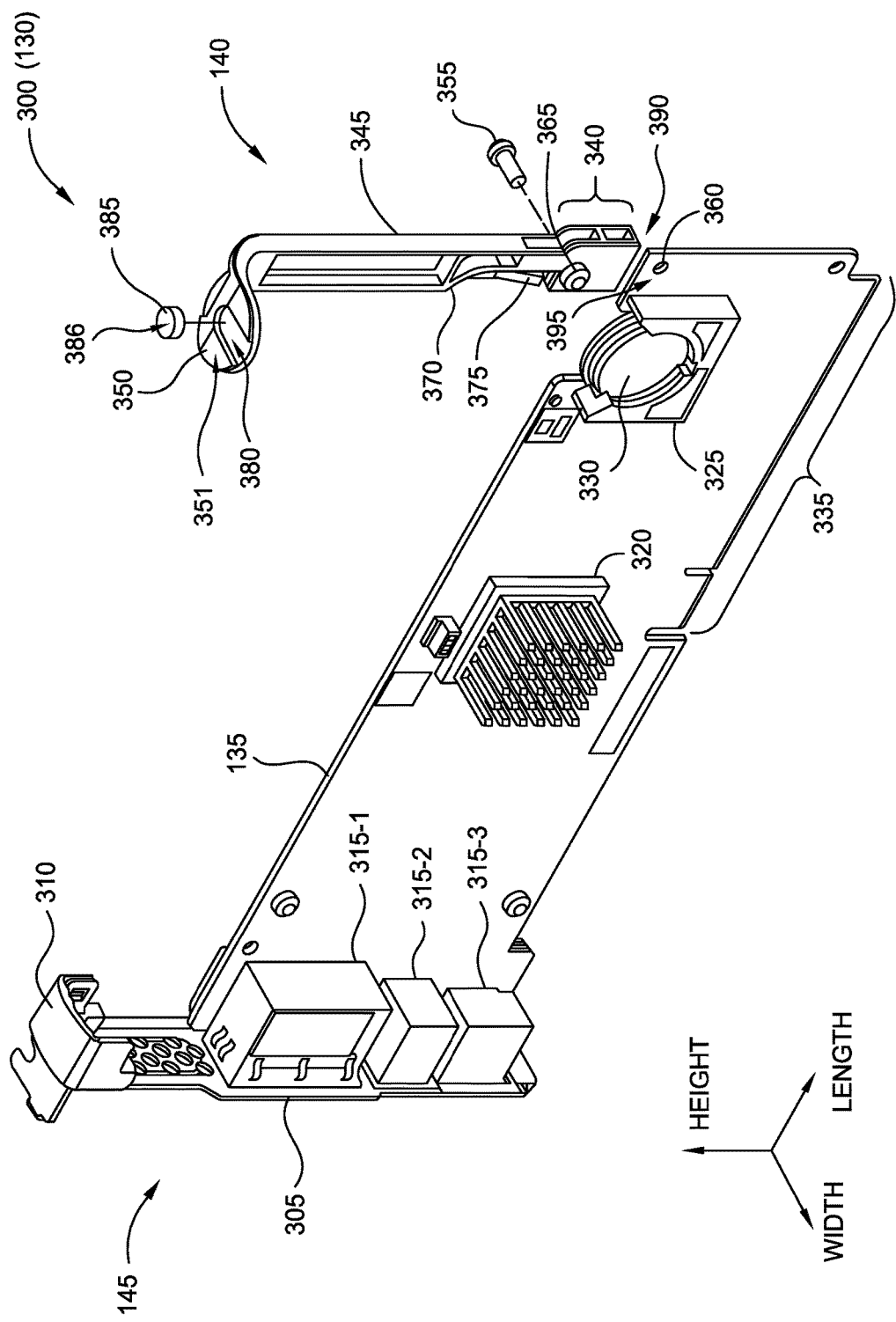
FIG. 3 is an exploded view of an exemplary expansion card, according to one or more embodiments.
Figure 4:
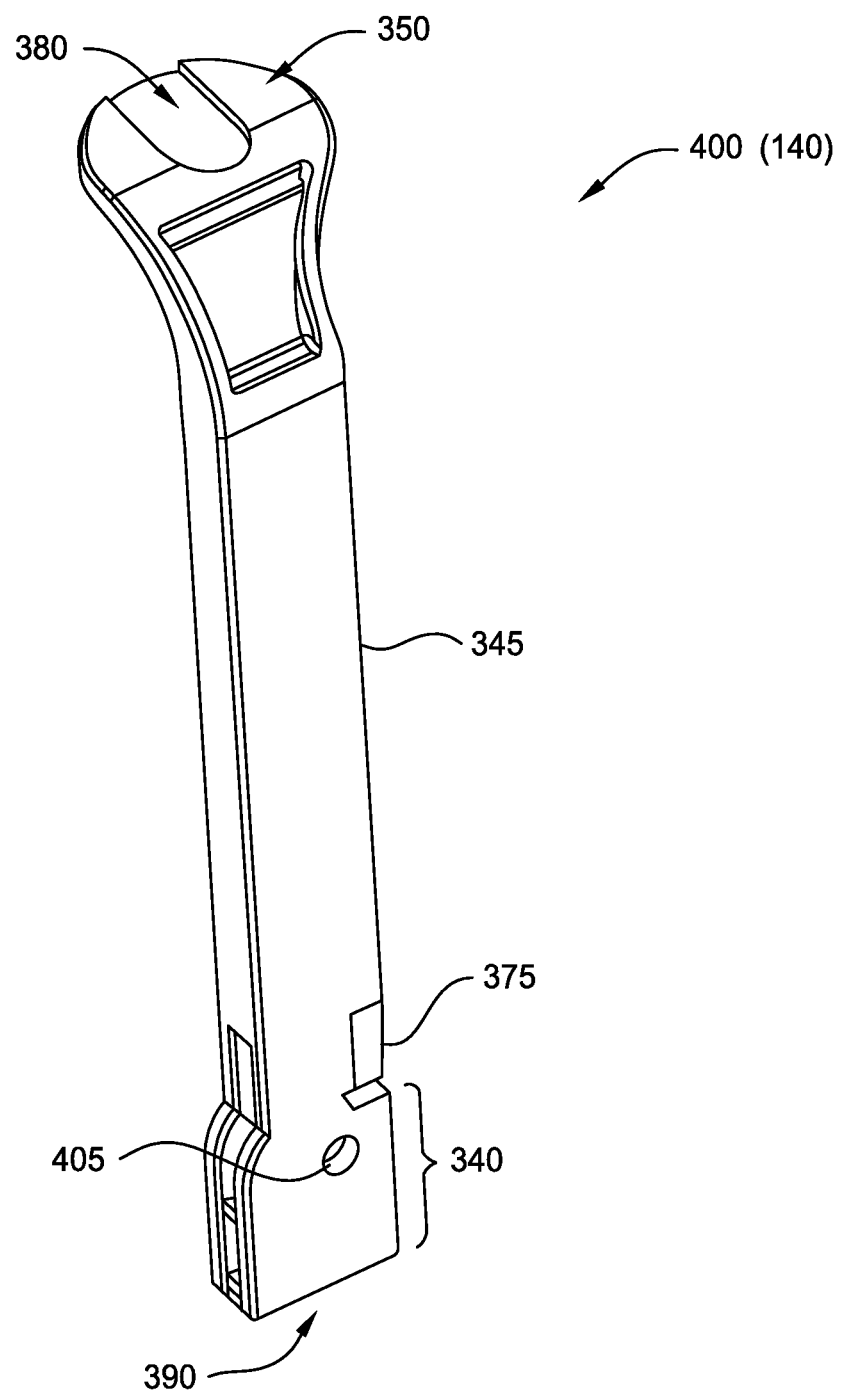
FIG. 4 is a view of an exemplary handle of an expansion card, according to one or more embodiments.

FIG. 3 is an exploded view 300 of an exemplary expansion card 130, according to one or more embodiments. FIG. 4 is a view of an exemplary handle 140 of the expansion card 130, according to one or more embodiments. The features depicted in FIGS. 3, 4 may be used in conjunction with other embodiments, such as the computing device 100 of FIG. 1 and/or the method 200 of FIG. 2.

The PCB portion 135 comprises a plurality of components. As shown, the PCB portion 135 includes a plurality of ports 315-1, 315-2, 315-3, a processor 320, and a battery bracket 325 configured to receive a battery 330. Other numbers and/or combinations of components are also possible. An edge connector 335 is formed in the PCB portion 135. The edge connector 335 is configured to be received by an edge connector socket (e.g., part of a PCB of the computing device). The edge connector 335 comprises a plurality of conductive pins. Other types of connectors are also contemplated.

The tailstock portion 145 is attached to the PCB portion 135. The tailstock portion 145 comprises a bracket 305. In some embodiments, the bracket 305 comprises a metal or other suitably rigid material(s). The plurality of ports 315-1, 315-2, 315-3 is externally accessible through openings formed in the bracket 305. The tailstock portion 145 further comprises a grip 310 attached to the bracket 305. The grip 310 may have any suitable dimensioning, material composition, texture, etc. to provide an improved gripping surface relative to the bracket 305. For example, the grip 310 may be formed of a plastic or rubber material. Further, the grip 310 may have a thickness greater than the bracket 305, may have rounded corners, and so forth.

The tailstock portion 145 is arranged at a first end along a length of the PCB portion 135, and the handle 140 is arranged at a second, opposing end of the PCB portion 135. The handle 140 comprises an elongated portion 345 arranged between a base portion 340 and a distal portion 350. The handle 140 may be formed of any material(s) providing suitable rigidity for limiting the motion of the expansion card 130, such as a plastic, metal, and/or rubber. In some embodiments, the handle 140 is monolithically formed. In other embodiments, the handle 140 comprises multiple attached components.

The base portion 340 is configured to overlap or align with the PCB portion 135 when attached to the PCB portion 135. As shown, a portion 395 of the PCB portion 135 is received into an opening 390 of the base portion 340, and an opening 405 extending through the base portion 340 aligns with an opening 360 extending through the PCB portion 135. A pin 355 may be inserted through the aligned openings 360, 405, and may be retained in the inserted position by a collar 365 of the base portion 340. In this configuration, the handle 140 is adjustable between a retracted position and an extended position by rotating about a single axis (i.e., extending through the opening 360). Stated another way, the coupling between the handle 140 and the PCB portion 135 may operate as a hinge, where the handle 140 rotates about an axis extending through the hinge. In some cases, a human operator may grasp the handle 140 directly (e.g., with his or her hand) or indirectly (e.g., using a tool) and rotate the handle 140 between the retracted position and the extended position, or vice versa.

In alternate embodiments, the PCB portion 135 may be arranged to provide a selectable axis of rotation for the handle 140. In one non-limiting example, the PCB portion 135 comprises a plurality of openings (including the opening 360), and the axis of rotation is selected by inserting the pin 355 through a selected opening of the plurality of openings. In another non-limiting example, the PCB portion 135 comprises an elongated opening, and the axis of rotation is selected by sliding the inserted pin 355 to a selected position. In such a case, the handle 140 and/or the PCB portion 135 may comprise a feature to maintain the inserted pin 355 at the selected position.

In the discussion above, the handle 140 is adjustable between different positions (i.e., at least the retracted position and the extended position) by rotation. However, in other embodiments the handle 140 may be adjusted differently. In one non-limiting example, the PCB portion 135 comprises a plurality of openings (including the opening 360) along the "height" direction, and the handle 140 is adjusted between different positions by inserting the pin 355 into different openings of the plurality of openings. In another non-limiting example, the PCB portion 135 comprises an elongated opening extending in the "height" direction, and the handle 140 is adjusted between different positions along the elongated opening. The handle 140 may include a feature to remain at a selected position, such as a bolt extending through the elongated opening and a nut that is tightened onto the bolt to maintain the handle 140 at the selected position. In another non-limiting example, the handle 140 may have an adjustable length (e.g., telescoping) for adjusting the handle 140 between different positions. Other means for adjusting the handle 140 are also contemplated. Further, the features discussed in the specific examples may be used in conjunction with each other (e.g., the PCB portion 135 comprises a plurality of openings and the handle 140 has an adjustable length).

As shown, the distal portion 350 has the appearance of a "foot" attached to the "leg" of the elongated portion 345. Described another way, the distal portion 350 extends in a direction that is substantially perpendicular to a long axis of the elongated portion 345. The transition between the distal portion 350 and the elongated portion 345 is rounded (one example of a gradual transition). In an alternate embodiment, the transition between the distal portion 350 and the elongated portion 345 may be less gradual, e.g., attached at a right angle transition.

When in the extended position, a surface of the handle 140 is configured to limit motion of the expansion card 130 toward a reference surface of the computing device. In some embodiments, the surface comprises a distal surface 351 of the distal portion 350. In other embodiments, the handle 140 comprises a damping member 385 arranged at its distal end, and the surface comprises a distal surface 386 of the damping member 385. As shown, a channel 380 is formed into the distal portion 350 from the distal surface 351, and the damping member 385 may be inserted into the channel 380. The damping member 385 may mitigate an amount of shock and/or vibrational energy transmitted to the expansion card 130. The damping member 385 may be attached to the distal portion 350 using any suitable techniques, such as a friction fit with the channel 380, an applied adhesive, and so forth. When inserted into the channel 380, the damping member 385 may extend past the distal surface 351 of the distal portion 350.

The handle 140 may be contoured based on features of the PCB portion 135 or one or more components thereof. As shown, the elongated portion 345 includes a curved recess 370 that is configured to receive a portion of the battery 330 when the handle 140 is in the retracted position.

In some embodiments, the handle 140 comprises a locking feature 375 that is configured to lock the handle 140 in the extended position. As shown, the locking feature 375 comprises a locking tab that is biased, such that the locking tab is depressed by the PCB portion 135 when the handle 140 is in the retracted position, and the locking tab extends into the plane of the PCB portion 135 when the handle 140 is in the extended position. To lock the handle 140, the extended locking tab limits motion of the handle 140 by engaging the PCB portion 135 (more specifically, the portion 395). To rotate the handle 140 from the extended position to the retracted position, the locking tab may be depressed or otherwise released. Other types of locking features are also contemplated.

Figure 5:
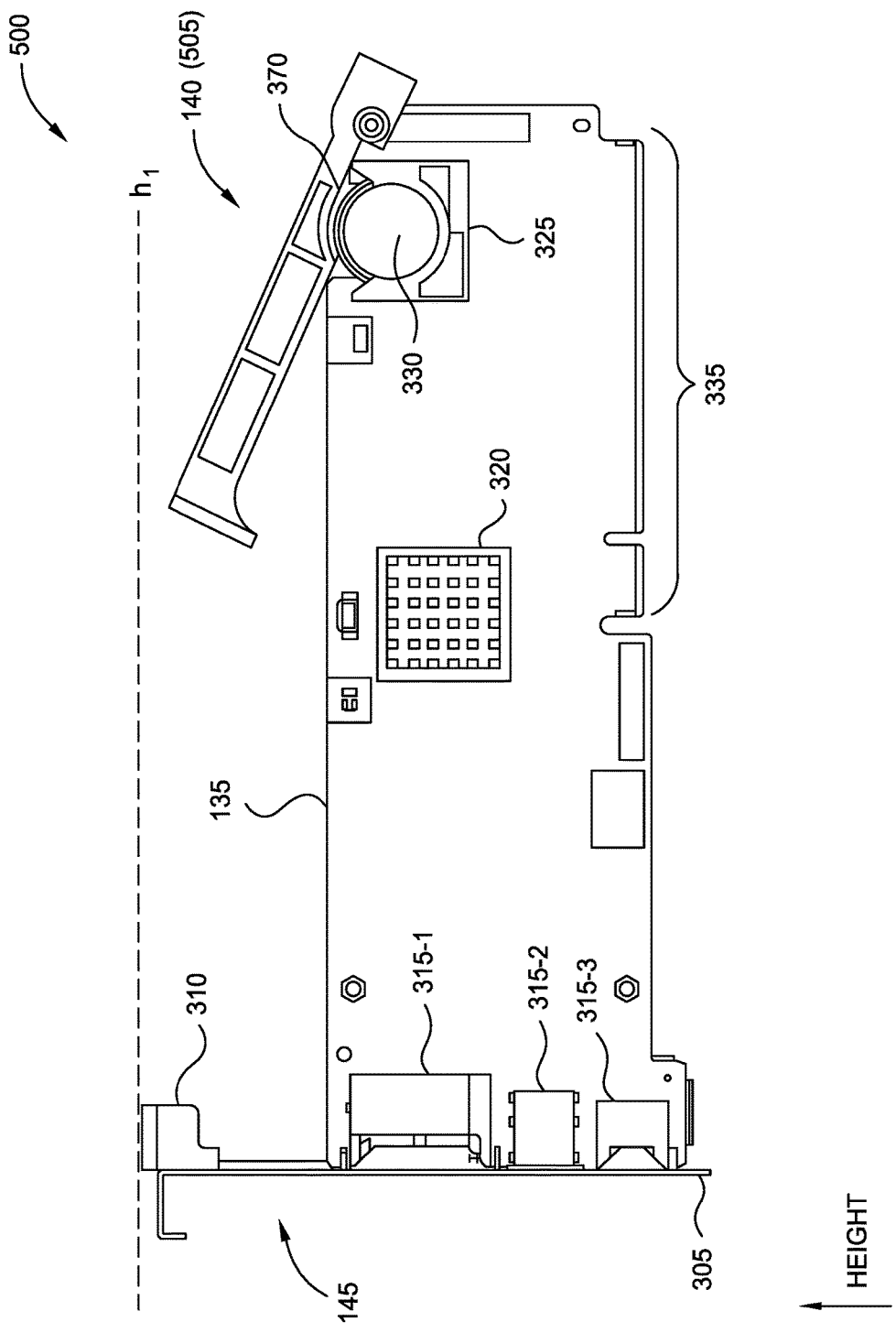
FIG. 5 is a view of an exemplary expansion card with a handle in a retracted position, according to one or more embodiments.
Figure 6:
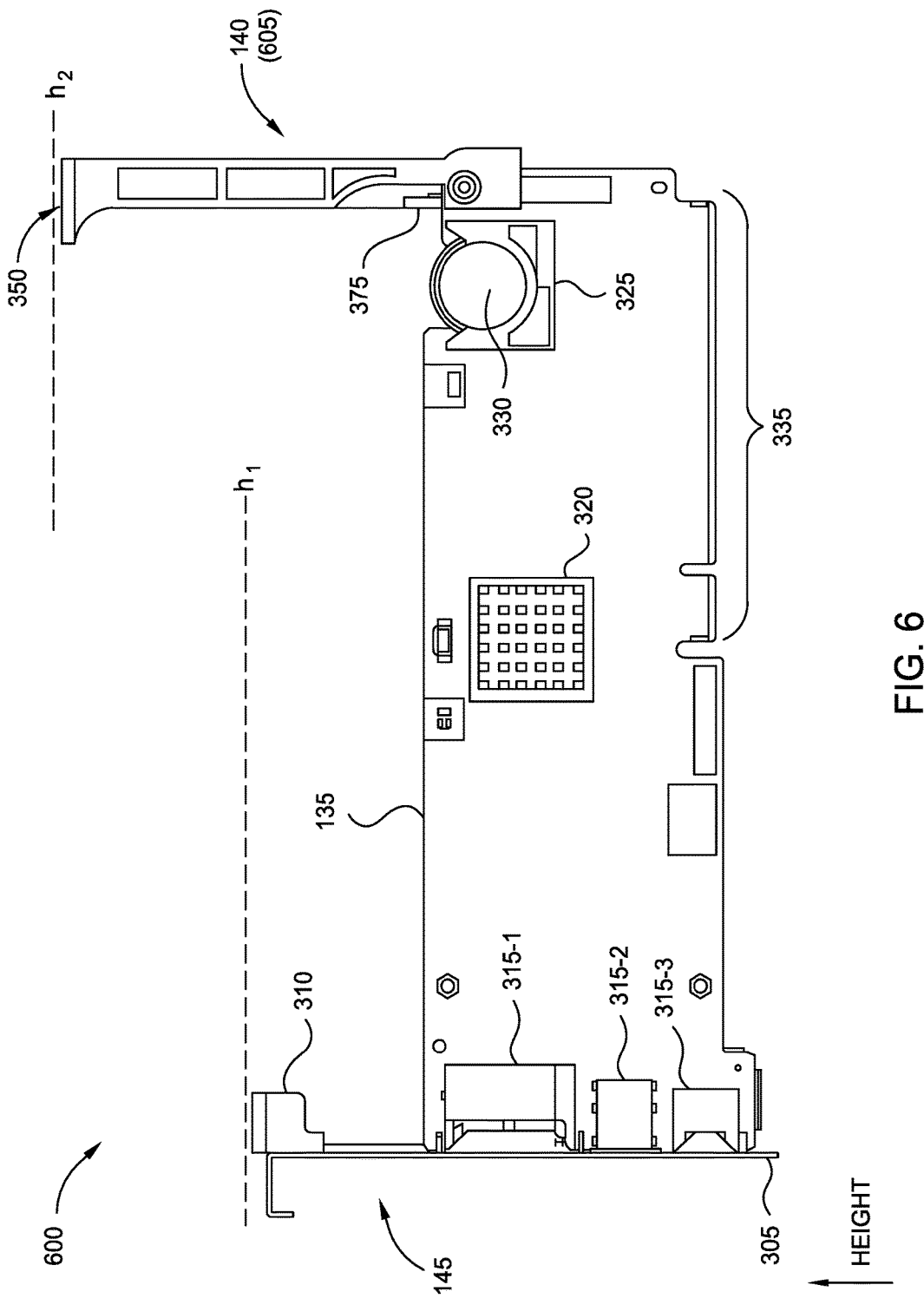
FIG. 6 is a view of an exemplary expansion card with a handle in an extended position, according to one or more embodiments.

In some embodiments, the height of the expansion card 130 is defined by the tailstock portion 145 when the handle 140 is in a retracted position 505 (shown in view 500 of FIG. 5). As shown in the view 500, the grip 310 of the tailstock portion 145 extends to a height $h_1$. In this way, the handle 140 may be dimensioned and/or arranged such that the expansion card 130 maintains a "normal" packaging size when the handle 140 is in the retracted position 505. In some embodiments, the height of the expansion card 130 is defined by the handle 140 when the handle 140 is in an extended position 605 (shown in view 600 of FIG. 6). As shown in the view 600, the distal portion 350 of the handle 140 extends to a height $h_2$ that is greater than the height $h_1$.

In the extended position 605, a long axis of the handle 140 may be substantially perpendicular to a long axis of the PCB portion 135 and/or substantially parallel to a direction of insertion for the edge connector 335. Beneficially, this arrangement of the handle 140 may better limit motion of the expansion card 130 to retain the expansion card 130 in an inserted state, and/or may ease installation and/or extraction of the expansion card 130. Further, although the handle 140 is depicted at an end of the PCB portion 135 opposite the tailstock portion 145, alternate implementations may include the handle 140 inset from the end of the PCB portion 135. For example, the handle 140 may be arranged directly above the edge connector 335, which may better limit motion of the expansion card 130 to retain the expansion card 130 in the inserted state.

Figure 7:
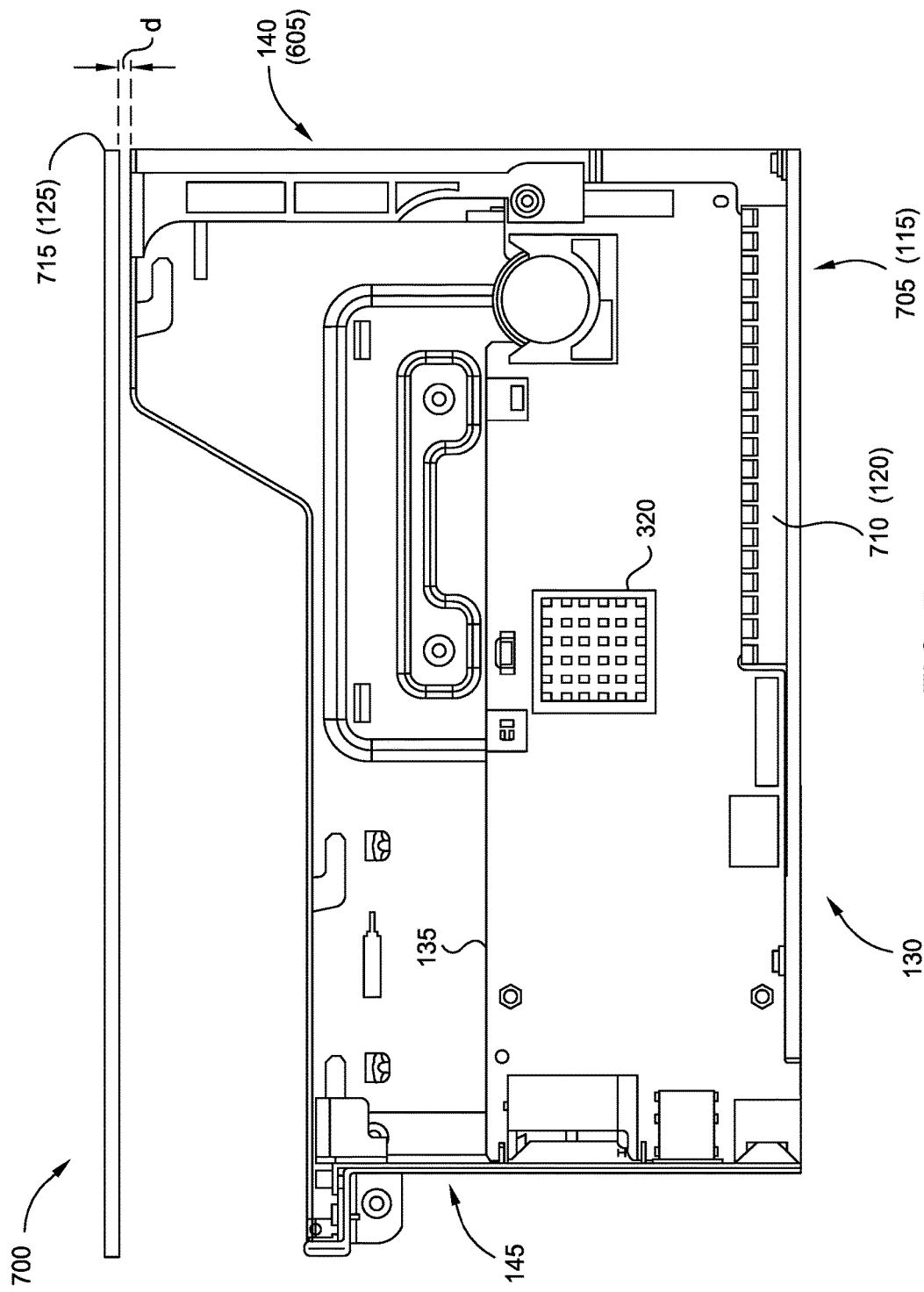
FIG. 7 is a view of an exemplary expansion card inserted in a connector of a computing device, according to one or more embodiments.

FIG. 7 is a view 700 of an exemplary expansion card 130 inserted in a connector 120 of a computing device, according to one or more embodiments. The features illustrated in the view 700 may be used in conjunction with other embodiments, such as the computing device 100 of FIG. 1. The computing device comprises a motherboard 705 (representing one example of the PCB 115) having an edge connector socket 710 (representing one example of the connector 120). The edge connector of the expansion card 130 is inserted in the edge connector socket 710. The computing device further comprises a cover 715 (representing one example of the reference surface 125) in an installed configuration. A distal end of the handle 140 in the extended position 605 is a distance d from the cover 715. In some embodiments, the distance d is less than an inserted distance of the edge connector of the expansion card 130. In this way, even if the edge connector begins to dislodge from the edge connector socket 710, the handle 140 will contact the cover 715 to maintain the expansion card 130 in an installed state. In some embodiments, the distance d is substantially zero, such that the distal end of the handle 140 is in a contacting relationship with the cover 715.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for use with a computing device, the method comprising:
    inserting, through an opening defined in an enclosure of the computing device, an expansion card into a connector of a printed circuit board (PCB) of the computing device, wherein the expansion card comprises a PCB portion connected to a proximal end of a handle, wherein the handle is adjustable between at least a retracted position and an extended position; and
    installing a cover of the computing device to thereby cover the opening, wherein the handle is dimensioned such that when the handle is in the extended position, a distance between a distal end of the handle and the cover is less than an inserted distance of the expansion card into the connector, such that the handle is configured to limit motion of the expansion card toward the cover.

2. The method of claim 1, wherein the expansion card comprises an edge connector,
    wherein the connector of the PCB comprises an edge connector socket configured to receive the edge connector.

3. The method of claim 1, further comprising:
    adjusting the handle from the retracted position to the extended position.

4. The method of claim 3, wherein the handle comprises a locking feature, and
wherein the locking feature is configured to lock the handle in the extended position.

5. The method of claim 3, wherein adjusting the handle from the retracted position to the extended position occurs prior to inserting the expansion card into the connector.

6. The method of claim 3, wherein adjusting the handle from the retracted position to the extended position comprises rotating the handle relative to the proximal end.

7. The method of claim 1, wherein the expansion card comprises a tailstock portion attached to the PCB portion,
wherein a height of the expansion card is defined by the tailstock portion when the handle is in the retracted position, and
wherein the height of the expansion card is defined by the handle when in the extended position.

8. An expansion card for use with a computing device, the expansion card comprising:
a printed circuit board (PCB) portion comprising an edge connector; and
a handle having a proximal end connected to the PCB portion,
wherein the handle is adjustable between at least a retracted position and an extended position, and
wherein the handle is dimensioned such that when (i) the handle is in the extended position and (ii) the edge connector is inserted to an inserted distance into an edge connector socket of the computing device, a distance between a distal surface of the handle and a reference surface of the computing device is less than the inserted distance, such that the handle is configured to limit motion of the expansion card toward the reference surface.

9. The expansion card of claim 8, wherein the handle is dimensioned such that the reference surface exerts a force on the PCB portion toward the edge connector socket.

10. The expansion card of claim 8, wherein the reference surface comprises a cover of the computing device.

11. The expansion card of claim 8, further comprising:
a locking feature configured to lock the handle in the extended position.

12. The expansion card of claim 8, wherein the handle is rotatable relative to the PCB portion.

13. The expansion card of claim 8, wherein the distal surface of the handle is defined by a damping material.

14. The expansion card of claim 8, further comprising:
a tailstock portion attached to the PCB portion,
wherein a height of the expansion card is defined by the tailstock portion when the handle is in the retracted position, and
wherein the height of the expansion card is defined by the handle when in the extended position.

15. A computing device comprising:
a printed circuit board (PCB) comprising a connector;
a reference surface; and
an expansion card removably inserted to an inserted distance into the connector, wherein the expansion card comprises:
a PCB portion; and
a handle having a proximal end connected to the PCB portion,
wherein the handle is adjustable between at least a retracted position and an extended position,
wherein the handle is dimensioned such that when (i) the handle is in the extended position and (ii) the expansion card is inserted to the inserted distance, a distance between a distal surface of the handle and the reference surface is less than the inserted distance, such that the handle is configured to limit motion of the expansion card toward the reference surface.

16. The computing device of claim 15, wherein the connector of the PCB comprises an edge connector socket, and
wherein expansion card comprises an edge connector inserted into the edge connector socket.

17. The computing device of claim 16, wherein the handle is dimensioned such that the reference surface exerts a force on the expansion card toward the edge connector socket.

18. The computing device of claim 15, wherein the reference surface comprises a cover of the computing device.

19. The computing device of claim 15, wherein the distal surface of the handle is defined by a damping material.

20. The computing device of claim 15, wherein the expansion card further comprises:
a tailstock portion attached to the PCB portion,
wherein a height of the expansion card is defined by the tailstock portion when the handle is in the retracted position, and
wherein the height of the expansion card is defined by the handle when in the extended position.

* * * * *